March 2, 1926.
E. F. KAISER
1,575,062
ELECTRICAL HAND POLISHING MACHINE
Filed March 17, 1921
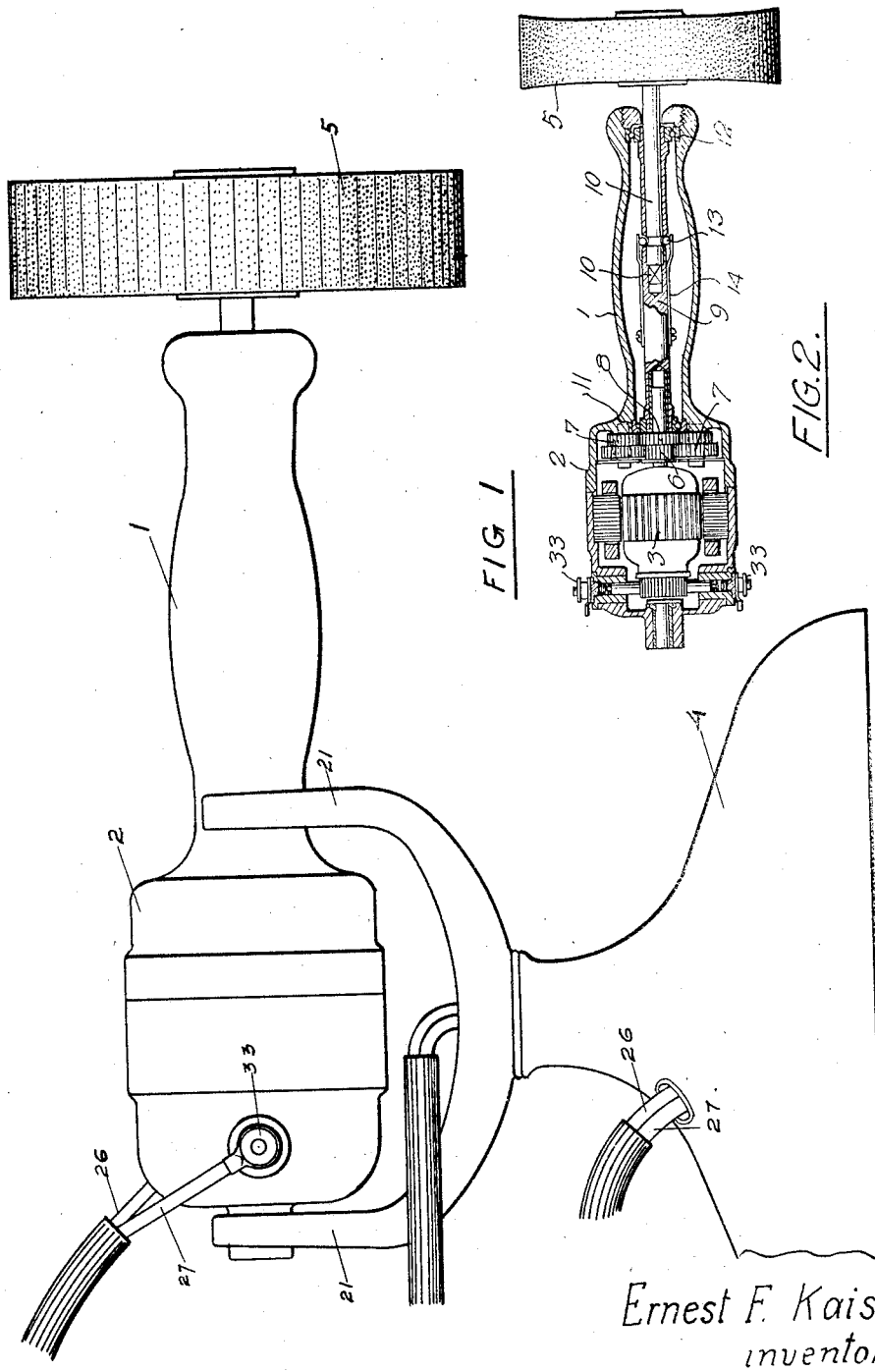
Ernest F. Kaiser
inventor
by his attorney Patented Mar. 2, 1926.

1,575,062

UNITED STATES PATENT OFFICE.

ERNEST F. KAISER, OF NEW YORK, N. Y.

ELECTRICAL HAND POLISHING MACHINE.

Application filed March 17, 1921. Serial No. 452,993.

*To all whom it may concern:*

Be it known that I, ERNEST F. KAISER, a citizen of the United States, and a resident of New York, in the county of New York and State of New York, have invented certain new and useful Improvements in Electrical Hand Polishing Machines, of which the following is a specification.

This invention relates to a machine for brushing, polishing or abrading, and has for its object to produce an electrically-driven machine convenient in form and construction to permit of its being used manually for the purpose desired.

The invention will be best understood by a consideration of the following detail description when read in conjunction with the accompanying drawings, in which:—

Figure 1 is a side elevation of a machine and stand therefor constructed according to this invention.

Figure 2 is a horizontal section of the machine.

In the drawings, 1 is a hollow casing shaped to form a handle to permit the device to be conveniently held in the hand of an operator, 2 is a motor casing forming a continuation of the casing 1 and housing a motor 3, 4 is a stand for holding the device when not in use, and 5 is a brush, wheel or like device for effecting the actual operation of brushing, polishing or abrading.

On the shaft of the motor 3 is mounted a toothed wheel 6 which drives, through pinions 7, a second toothed wheel 8 mounted on a shaft 9, disposed centrally within the handle-shaped casing 1. The shaft 9 is adapted to receive and drive the shaft 10 of the brush, wheel or like device 5, and, as shown in Figure 2, is bored to provide a square socket to receive the squared end 10* of said shaft. Ball bearings are provided between the shaft 9 and the casing 1 as indicated at 11 and also between the latter and the shaft 10 as shown at 12. Balls 13, controlled by springs 14 screwed to the shaft 9, are also provided to ensure the shaft 10 "snapping" into and being retained in engagement with the shaft 9.

By supporting the inner end of shaft 9 antifrictionally at the inner end of the handle 1, the outer end anti-frictionally at 12, and coupling the shafts 9 and 10 in the manner shown, at about the center of the handle 1, an evenly balanced assembly is secured and practically a solid drive shaft is secured with the strains distributed and neutralized.

It will readily be seen that by the construction just described the substitution of one brush, wheel or like device 5 for another to suit the requirements of the operation to be performed by the machine can be easily and readily effected.

The stand 4 is provided at its upper end with a U-shaped arm on each end of which is provided a fork 21, to receive the device when not in use as will be clearly seen in Figure 1. The stand 4 carries a suitable electrical switch (not shown) between the terminals of which, and the terminals 33, are electrical conductors 26 and 27 for supplying electrical energy from a suitable source to the motor 3, which in turn imparts rotary motion to the brush 5 by virtue of the intervention of the transmission gearing 6, 7 and 8, and shafts 9 and 10.

What I claim and desire to secure by Letters Patent is:

1. A device as herein characterized and comprising a handle shaped tubular casing, an extension housing at one end of said casing, an electric motor housed within said housing, a driving shaft within said handle driven by said motor and supported within said handle at its front and rear ends, the front portion of said driving shaft being tubular and having a counter-bored square socket at its inner end, plate springs secured at one end to said driving shaft, balls mounted in the walls of the tubular front portion of the driving shaft and movable to project within the hollow thereof, said springs overlying and pressing upon said balls, a driven shaft carrying at its outer end a brush and mounted within the tubular front end of the driving shaft, the inner end of the driven shaft reduced and squared and fitted in the square socket within the driving shaft, a circumferential semicircular groove being provided adjacent the inner end of the driven shaft receiving the said spring pressed balls whereby to form a detachable connection between said driving and driven shafts.

2. A machine as described comprising a handle shaped casing expanded at one end to form an extension housing, a motor housed within said housing, a driving shaft within the handle casing and driven from said motor, said shaft having a tubular front portion, a brush having a shaft projecting therefrom and adapted to be received within the tubular front portion of the driving shaft, balls mounted in the walls of the tubular front portion of the driving shaft and movable to project within the hollow thereof, plate springs attached to the driving shaft, said springs pressing upon said balls, a circumferential groove being formed in the driven shaft and receiving said balls to form a detachable connection between said two shafts, and coacting square connections between said shafts whereby rotary motion will be imparted to the driven shaft by revolution of the driving shaft.

Signed at New York, in the county of New York and State of New York, this first day of February A. D. 1921.

ERNEST F. KAISER.